United States Patent
Morelli et al.

(10) Patent No.: US 12,052,212 B1
(45) Date of Patent: Jul. 30, 2024

(54) COMMUNICATION CHANNEL CURATION

(71) Applicant: Clubster, LLC, Mercer Island, WA (US)

(72) Inventors: McRedmond Morelli, Mercer Island, WA (US); Patrick James Murray, Lancaster, OH (US); Bryan Freitas, Angra do Heroísmo (PT); William J. King, Dallas, TX (US)

(73) Assignee: Clubster, LLC, Mercer Island, WA (US)

( * ) Notice: Subject to any disclaimer, the term of this patent is extended or adjusted under 35 U.S.C. 154(b) by 0 days.

(21) Appl. No.: 18/223,939

(22) Filed: Jul. 19, 2023

(51) Int. Cl.
*H04L 51/216* (2022.01)

(52) U.S. Cl.
CPC ................... *H04L 51/216* (2022.05)

(58) Field of Classification Search
CPC .............................. H04L 51/216; H04W 4/12
See application file for complete search history.

(56) References Cited

U.S. PATENT DOCUMENTS

| | | | |
|---|---|---|---|
| 11,075,870 B1 * | 7/2021 | Baez | H04L 51/42 |
| 2007/0094346 A1 * | 4/2007 | Nussey | H04L 67/55 |
| | | | 709/217 |

* cited by examiner

*Primary Examiner* — Caroline H Jahnige (57) ABSTRACT

Methods, systems, and apparatus, including computer programs encoded on a computer storage medium, to curate communication channels are disclosed. In one aspect, a method includes the actions of maintaining, by a computing device, a communication channel that includes a first channel message and a second channel message. The actions further include determining, by the computing device, first characteristics of the first channel message and second characteristics of the second channel message. The actions further include, based on the first characteristics of the first channel message, determining, by the computing device, a first period of time to maintain the first channel message on the communication channel. The actions further include, based on the second characteristics of the second channel message, determining, by the computing device, a second, different period of time to maintain the second channel message on the communication channel.

20 Claims, 3 Drawing Sheets

COMMUNICATION CHANNEL CURATION

TECHNICAL FIELD

This specification generally relates to communication channel feeds, and, in more detail, to curation of messages in a communication channel feed.

BACKGROUND

Clubs are an enduring institution that bring people together for a variety of purposes. There are many kinds of clubs, some more formal, some informal, but most clubs have a need to communicate with their members and a desire to facilitate communication among members. Over the years different types and modes of communication have waxed and waned in popularity and more recently there has been a proliferation of types of computer-facilitated communication. Individuals may have preferred types and modes of communication depending on the club or activity, or just in general. Particular activities may lend themselves to particular types or modes of communication.

SUMMARY

A club communication channel, or newsfeed, serves multiple purposes. In particular, the newsfeed will include messages of varying relevance on different timescales. Some messages may be highly relevant for weeks (e.g., upcoming major events), days (e.g., reminder for recurring meetings), and some just hours (e.g., today's menu). In contrast, some messages may be defining moments of the club, relevant for years if not in perpetuity. It is desirable to be able to curate a club's newsfeed to remove messages that are no longer relevant while preserving a set of showcase messages that communicate the club's nature and culture to members interested in the club's history, such as new members. In some instances, curation of a club's newsfeed may be done manually, which can be time consuming and expensive. Automating curation of the newsfeed can save time and resources as well as reducing the need to provide an interface for users to interact with the newsfeed to manually select messages for removal. Automating curation functionality may include scheduling message removal, assigning an importance score to a message, and/or analyzing messages for popularity and other engagement statistics. One or more of these curation functions may utilize models trained using machine learning.

An innovative aspect of the subject matter described in this specification may be implemented in methods that include the actions of maintaining, by a computing device, a communication channel that includes a first channel message and a second channel message; determining, by the computing device, first characteristics of the first channel message and second characteristics of the second channel message; based on the first characteristics of the first channel message, determining, by the computing device, a first period of time to maintain the first channel message on the communication channel; and, based on the second characteristics of the second channel message, determining, by the computing device, a second, different period of time to maintain the second channel message on the communication channel.

These and other implementations can each optionally include one or more of the following features. The actions include determining, by the computing device, that the first period of time has elapsed; and, based on determining that the first period of time has elapsed, removing, by the computing device, the first channel message from the communication channel. The action of determining the second, different period of time to maintain the second channel message on the communication channel includes determining to maintain the second channel message on the communication channel in perpetuity.

The action of determining, by the computing device, the first period of time to maintain the first channel message on the communication channel includes providing, by the computing device, the first characteristics of the first channel message as an input to a model that is configured to receive given characteristics of a given channel message and output data indicating a given period of time to maintain the given channel message on the given communication channel; and receiving, from the model, data indicating the first period of time to maintain the first channel message on the communication channel.

The first characteristics of the first channel message include a content of the first channel message; an interest group associated with the first channel message; user engagement with the first channel message; and a date of an event specified by the first channel message. The actions include determining, by the computing device, channel messages included in the communication channel. The action of determining the first period of time to maintain the first channel message on the communication channel is based further on the channel messages included in the communication channel. The action of determining the second, different period of time to maintain the second channel message on the communication channel is based further on the channel messages included in the communication channel.

The actions include determining, by the computing device, a first importance level of the first channel message, wherein the first importance level indicates a first likelihood that a first user will engage with the first channel message at a first future time; and determining, by the computing device, a second importance level of the second channel message, wherein the second importance level indicates a second likelihood that a second user will engage with the second channel message at a second future time. The action of determining the first period of time to maintain the first channel message on the communication channel is based further on the first importance level of the first channel message. The action of determining the second, different period of time to maintain the second channel message on the communication channel is based further on the second importance level of the second channel message.

The actions include receiving, by the computing device, a request for a third channel message that was previously removed from the communication channel; and determining, by the computing device, third characteristics of the third channel message. The action of determining the first period of time to maintain the first channel message on the communication channel is based further on the third characteristics of the third channel message and the request for the third channel message. The action of determining the second, different period of time to maintain the second channel message on the communication channel is based further on the third characteristics of the third channel message and the request for the third channel message.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. Messages may be maintained for only as long a relevant to the users, which reduces the number of messages to present to a user and reduces the processing power and network bandwidth needed to transmit message feeds to various computing devices.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
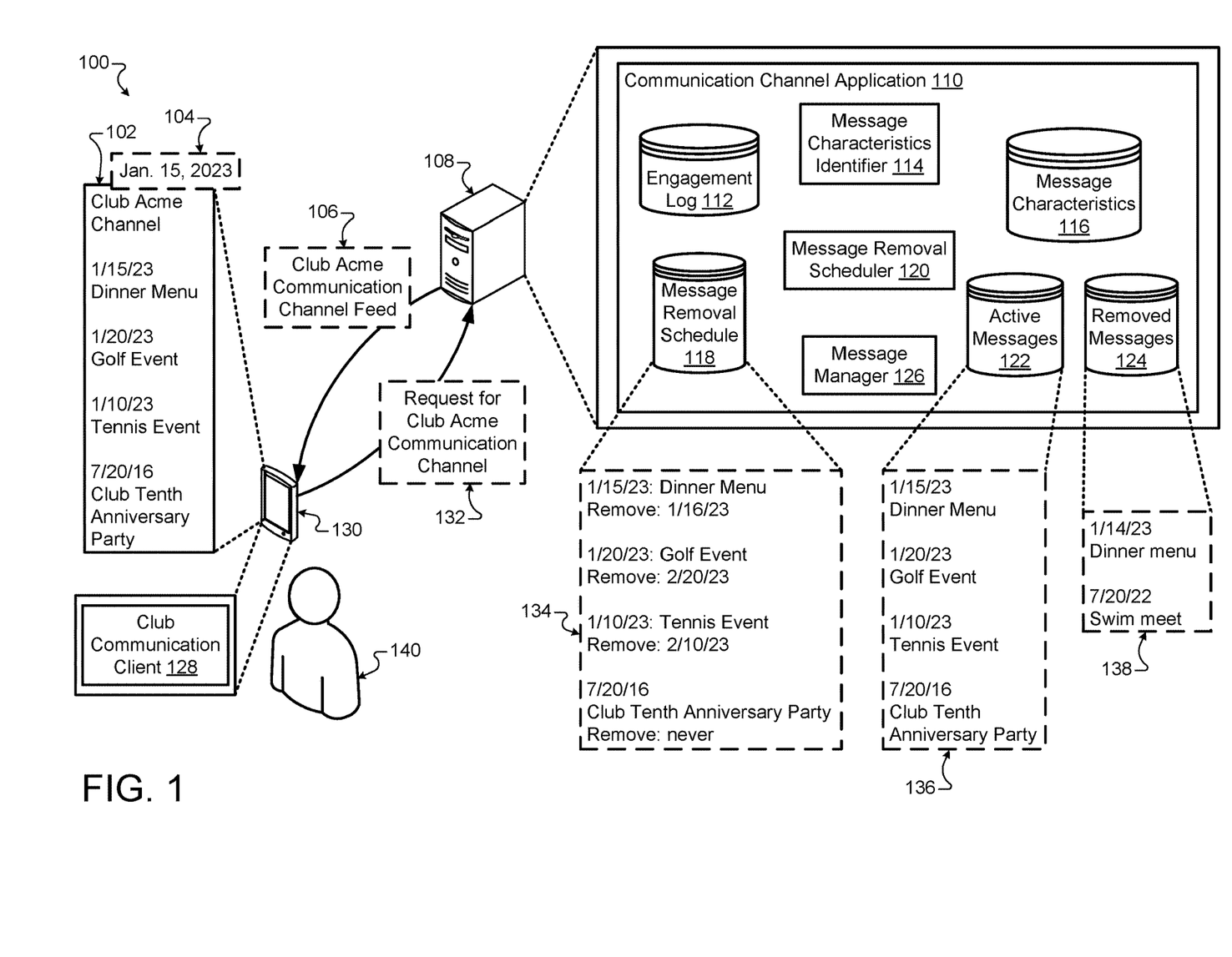
FIG. 1 illustrates an example system that is configured to curate a communication channel in accordance with at least one embodiment.

FIG. 1 illustrates an example system 100 that is configured to curate a communication channel. Briefly, and as described in more detail below, the user 102 may be interacting with the club communication client 128 on the computing device 130. The user 102 may be attempting to view the communication channel for Club Acme. The club communication client 128 may interact with the communication channel application 110 of the server 108. The communication channel application 110 may select the messages to present to the user 102 based on various factors that will be discussed below.

In more detail, the communication channel application 110 is configured to manage the communication channels for various clubs. Each club may have a communication channel to disseminate information to members. The communication channel application 110 may receive messages from each club and curate them so that relevant and informative messages are presented to the club members. Each club may have different criteria for what messages to maintain in the communication channel and for how long to maintain the messages. This criteria may be continuously evolving based on how the members of the club interact with the messages in a communication channel, the events of the club, and/or any other similar factors. The example of FIG. 1 illustrates the communication channel application 110 managing the communication channel for a single club. The communication channel application 110 may use similar techniques described below for communication channels for other clubs.

The server 108 may implement the communication channel application 110 by executing software on one or more processors. The server 108 may be any type of computing device that is configured to communicate with other computing devices. For example, the server 108 may be a desktop computer, a laptop computer, a mobile device, a tablet, and/or any other similar type of computing device. In some implementations, the server 108 may be a virtual computing device located in the cloud. In some implementations, various components of the server 108 may be implemented on different computing devices.

The communication channel application 110 may include a message manager 126. The message manager 126 may be configured to receive messages from various clubs and remove messages from various clubs. The messages may be any type of text, image, video, or audio based message that the club may wish to disseminate to its members. For example, a message may include the dinner menu for the day, social events that are upcoming or have past, sporting events that are upcoming or have past, media from past events, new member announcements, and/or any other similar type of information.

The message manager 126 may store messages received from the club in the active messages 122. The active messages 122 may be located in a storage device that is accessible by the server 108. The active messages 122 may include the content of each message, the time and date that the communication channel application 110 received the message, data identifying an interest group associated with the message, data identifying an author or sender of the message, a link to additional information, and/or any other similar information.

In the example of FIG. 1 and on the date of Jan. 15, 2023, the active messages 122 may include a message for the dinner menu for Jan. 15, 2023, a message for a golf event that is occurring on Jan. 20, 2023, a message for a tennis event that occurred on Jan. 10, 2023, a message for a golf event that will occur on Jan. 20, 2023, and a message for a club tenth anniversary party that occurred on Jul. 20, 2016.

The communication channel application 110 may include a message characteristics identifier 114. The message characteristics identifier 114 may be configured to analyze the active messages 122 and identify various characteristics of each message. The characteristics may include the date the communication channel application 110 received the message, a date that corresponds to an event in the message, an interest group associated with the message, a sport associated with the message, media content in the message, an importance score assigned by a user, and/or any other similar characteristics.

The message characteristics identifier 114 may be configured to analyze a message upon receipt by the communication channel application 110. In some implementations, the message characteristics identifier 114 may periodically analyze the active messages 122. For example, the message characteristics identifier 114 may analyze the active messages 122 once per day. In some implementations, the message characteristics identifier 114 may analyze the active message 122 in response to a request or in response analyzing additional data. For example, the message characteristics identifier 114 may analyze the active messages 122 in response to a request from the message manager 126, which may request that the message characteristics identifier 114 analyze the active messages 122 in response to not receiving a new message or a request for the communication channel in a particular period of time.

The message characteristics identifier 114 may store the characteristics for the messages in the message characteristics 116. The message characteristics 116 may be located in a storage device that is located in or accessible by the server 108. The message characteristics 116 may include the characteristics of the messages as identified by the message characteristics identifier 114. The message characteristics 116 may also include data that maps the characteristics for the messages to the respective message in the active messages 122.

In some implementations, the message characteristics 116 may also include the characteristics of messages in the removed messages 124. The removed messages 124 will be discussed below. In short, the removed messages 124 includes the messages that were previously in the active messages 122 but are no longer included in the club communication channel. Because the removed messages 124 were previously in the active messages 122, the message characteristics identifier 114 may have previously analyzed those messages and stored the characteristics in the message characteristics 116.

In some implementations, the message characteristics 116 may not include the characteristics of messages in the removed messages 124. In this case, the message characteristics identifier 114 may remove the characteristics of messages once those messages move from the active messages 122 to the removed messages 124.

The communication channel application 110 may include an engagement log 112. The message manager 126 may be configured to monitor the engagement that each club member has with the messages in the communication channel. The message manager 126 may store data related to the interactions that that club members have with the messages in the communication channel. The engagement log 112 may be located in a storage device that is included in the server 108 and/or accessible by the server 108.

The engagement log 112 may include engagement details for each message in the active messages 122. In some implementations, the engagement log 112 may include engagement details for the messages in the removed messages. The message manager 126 may monitor the messages in the communication channel upon presentation of the messages to a club member. The message manager 126 may monitor whether the club member selects a message, selects a link within a message, views media included in a message, has the message displayed on a screen of the computing device displaying the messages in the communication channel, comments on a message, like a message, dislikes a message, forwards a link to a message, and/or any other similar type of engagement. The message manager 126 may store data indicating the interaction, data identifying the message, a timestamp, data identifying the club member, data identifying the computing device on which the club member viewed the message, and/or any other similar data in the engagement log 112.

In some implementations, the engagement log 112 may include data indicating that a club member has requested that a message be removed from the communication channel. In this case, the message manager 126 may include, in the engagement log 112, data identifying the message, data identifying the member, a timestamp, a reason provided by the member, and/or any other similar information. In some implementations, the engagement log 112 may include data indicating that a club member requested that a previously removed message be reactivated. In this case, the message manager 126 may include, in the engagement log 112, data identifying the message, data identifying the member, a timestamp, a reason provided by the member, data indicating when the message was removed, data indicating whether the message manager 126 is able to identify the message specified by the member, and/or any other similar information.

The communication channel application 110 may include a message removal scheduler 120. The message removal scheduler 120 may be configured to analyze the message characteristics 116 and/or the engagement log 112 related to the active messages 122 and determine a schedule to move one or more of the messages in the active messages 122 to the removed messages 124. In some implementations, the message removal scheduler 120 may also analyze the message characteristics 116 and/or engagement log 112 related to the removed messages 122 and determine whether any of those messages should be moved to the active messages 122 and a corresponding schedule for that move to occur.

The message removal scheduler 120 may generate message removal schedule 118. The message removal schedule 118 may indicate a date which each message in the active messages 122 should be moved to the removed messages 124. The message removal schedule 118 may be located in a storage device that is located in or accessible by the server 108. The message manager 126 may compare the active messages 122 to the message removal schedule 118 on a periodic basis, such as once per day. If the message manager 126 determines that the message removal schedule 118 specifies for a message in the active messages 122 to be moved to the removed messages 124, then the message manager 126 may perform the message move. In some implementations, the message manager 126 may remove the corresponding instruction to remove the message from the message removal schedule 118.

In the example of FIG. 1 and on the date of Jan. 15, 2023, the message removal schedule 118 may include removal dates for the messages in the active messages 122. The message for the Jan. 15, 2023 dinner menu may have a removal date of Jan. 16, 2023. The message for the Jan. 20, 2023 golf event may have a removal date of Feb. 20, 2023. The message for the Jan. 10, 2023 tennis event may have a removal date of Feb. 10, 2023. The message for the Jul. 20, 2016 tenth anniversary party may have a removal date of never. The message manager 126 may have previously removed the message for the Jan. 14, 2023 dinner menu and the message for the Jul. 20, 2022 golf event. These messages may be included in the removed messages 124. In some implementations, the removed messages 124 may include data identifying when each message was removed.

The message removal scheduler 120 may use various techniques to generate the message removal schedule 118. The message removal scheduler 120 may use various rules and/or models to analyze the message characteristics 116 and/or the engagement log 112. The rules and models will be discussed in more detail below. In short, the rules may specify various ranges, thresholds, and/or other comparison techniques to use to analyze the message characteristics 116 and/or the engagement log 112. An example rule may indicate that a message related to a daily menu should be removed the following day. The models may be configured to receive the message characteristics 116 and/or the engagement log 112 for a specific message and output data indicating a date to remove the corresponding model.

The message removal scheduler 120 may analyze the message characteristics 116 and/or the engagement log 112 on a periodic basis. For example, the message removal scheduler 120 may analyze the message characteristics 116 and/or the engagement log 112 once per day. The message removal scheduler 120 may analyze the message characteristics 116 and/or the engagement log 112 in response to a request. For example, the message removal scheduler 120 may analyze the message characteristics 116 and/or the engagement log 112 in response to a user submitting a request indicating that a message on the communication channel is out of date. The message removal scheduler 120 may analyze the message characteristics 116 and/or the engagement log 112 in response to a determination. For example, the message removal scheduler 120 may analyze the message characteristics 116 and/or the engagement log 112 in response to the message removal schedule 118 indicating that it is time to remove a message.

The components of the communication channel application 110 may continuously receive and remove messages from the communication channel. By doing so, the communication channel application 110 is prepared to output the active messages 122 of the communication channel in response to a request to review the current communication channel. The communication channel application 110 may receive requests from a club communication client 128 that may be running on a computing device 130. The computing device 130 may be any type of device that is configured to communicate with other computing devices. For example, the computing device 130 may be a desktop computer, a laptop computer, a mobile phone, a tablet, a smart watch, a smart speaker, a smart appliance, and/or any other similar type of device.

The club communication client 128 may receive a request from the user 140 to view the communication channel for a club, such as Club Acme. The club communication client 128 may transmit a request 132 for the communication channel for the specified club to the communication channel application 110. The communication channel application 110 may receive the request 132 and select the active messages 122 for the specified club. The communication channel application 110 may generate a channel feed 106 that includes the active messages 122 for the specified club. The communication channel application 110 may output the channel feed 106 to the computing device 130. The club communication client 128 may receive the channel feed 106 and output the channel feed interface 102 on the display of the computing device 130. The user 140 may interact with the channel feed interface 102.

In the example of FIG. 1 and on Jan. 15, 2023, the user 130 interacts with the club communication client 128 on the computing device 130. The user 130 requests to view the communication channel for Club Acme. The club communication client 128 generates and transmits the request 132 for the communication channel for Club Acme. The message manager 126 of the communication channel application 110 receives the request 132 and accesses the active messages 122. The active messages include a message for the dinner menu for Jan. 15, 2023, a message for a golf event that is occurring on Jan. 20, 2023, a message for a tennis event that occurred on Jan. 10, 2023, a message for a golf event that will occur on Jan. 20, 2023, and a message for a club tenth anniversary party that occurred on Jul. 20, 2016. The message manager 126 generates the channel feed 106 for Club Acme using the active messages 122. The server 108 transmits the channel feed 106 to the computing device 130. The club communication client 128 of the computing device 130 receives the channel feed 106. The club communication client 128 outputs the interface 102 that includes the message for the dinner menu for Jan. 15, 2023, a message for a golf event that is occurring on Jan. 20, 2023, the message for a tennis event that occurred on Jan. 10, 2023, the message for a golf event that will occur on Jan. 20, 2023, and the message for a club tenth anniversary party that occurred on Jul. 20, 2016.

The club communication client 128 may monitor the channel feed interface 102 for how the user 140 may interact or engage with the channel feed. The club communication client 128 may generate engagement data and transmit that engagement data to the communication channel application 110. The engagement data may indicate what type of engagement the user 140 had with the channel feed, an identity of the user 140, data identifying the message, a timestamp of the engagement, and/or any other similar information. The communication channel application 110 may store the engagement data in the engagement log 112.

Figure 2:
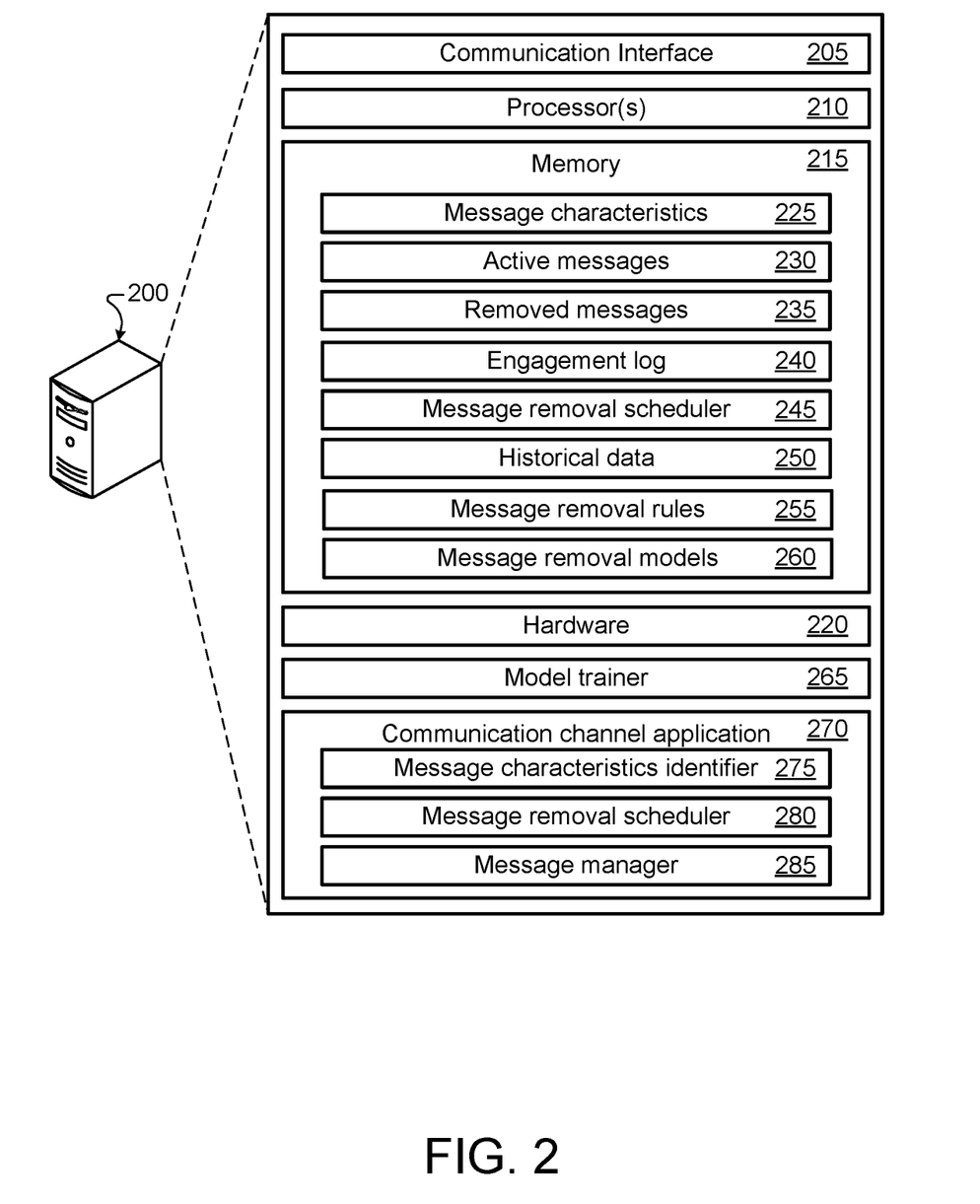
FIG. 2 illustrates an example server that is configured to curate a communication channel in accordance with at least one embodiment.

FIG. 2 illustrates an example server 200 that is configured to curate a communication channel. The server 200 may be any type of computing device that is configured to communicate with other computing devices. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 108 of FIG. 1. Some of the components of the device may be implemented in a single computing device or distributed over multiple computing devices. Some of the components may be in the form of virtual machines or software containers that are hosted in a cloud in communication with disaggregated storage devices. In some implementations, the server 200 may be a virtual device hosted in the cloud.

The server 200 may include a communication interface 205, one or more processors 210, memory 215, and hardware 220. The communication interface 205 may include communication components that enable the server 200 to transmit data and receive data from other devices and networks. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a communication channel application 270 by executing software stored in the memory 215. The communication channel application 270 may be similar to the communication channel application 110 of FIG. 1. The communication channel application 270 may be configured to interact with communication channel clients that may be running on other computing devices. A communication channel client may request communication channels for various clubs that the user of the computing device may be a member of. The communication channel application 270 may be configured to manage multiple channels for multiple clubs and provide the communication channels to the communication channel clients upon request.

The communication channel application 270 may be configured to receive messages from other computing devices. The messages may be inputted by a user or automatically generated by the computing device of the user or the communication channel application 270. The messages may be automatically generated, for example, based on recurring events such as an annual golf event that occurs on Labor Day weekend. Initially, the communication channel application 270 may store the received messages in the active messages 230. The active messages 230 may be similar to the active messages 122 of FIG. 1.

The communication channel application 270 may include a message manager 285. The message manager 285 may be similar to the message manager 126 of FIG. 1. The message manager 285 may be configured to receive new messages for the communication channel, respond to requests for a communication channel, and maintain the communication channel. Maintaining the communication channel involves removing selected messages from the communication channel according to a schedule.

The message manager 285 may also be configured to monitor user engagement with the various messages on the communication channel. The message manager 285 may store engagement data in the engagement log 240. The engagement log 240 may be similar to the engagement log 112 of FIG. 1. The engagement log 240 may include details related to how the various users interact with the messages in the communication channel. The details related to how the various users interact with the messages may include whether the user has selected a message, any comments or likes that a user leaves on a message, how long a message remains on the screen of a computing device of a user, a number of times that a message appears on the screen of the computing device of a user, whether a user has viewed any media in a message, the audio volume of the computing device of a user when listening to media in a message, whether the user has forwarded a message to another user, and/or any other similar interaction.

The communication channel application 270 may include a message characteristics identifier 275. The message characteristics identifier 275 may be similar to the message characteristics identifier 114 of FIG. 1. The message characteristics identifier 275 may be configured to analyze messages received by the communication channel application 270 and/or stored in the active messages 230. Based on the analysis, the message characteristics identifier 275 may identify one or more characteristics of the messages. In some implementations, the message characteristics identifier 275 may identify the characteristics upon receipt of the message. In some implementations, the message characteristics identifier 275 may identify the characteristics in response to a request from a component of the communication channel application 270 or from another computing device.

The message characteristics identifier 275 may store the message characteristics in the message characteristics 225. The message characteristics 225 may be similar to the message characteristics 116 of FIG. 1. The message characteristics 225 may include the date the communication channel application 270 received the message, a date that corresponds to an event in the message, an interest group associated with the message, a sport associated with the message, media content in the message, an importance score, and/or any other similar characteristics. The communication channel application 270 may receive an importance score from a user who provides the message. In some implementations, the communication channel application 270 may determine an importance score based on analyzing the message.

The communication channel application 270 may include a message removal scheduler 280. The message removal scheduler 280 may be similar to the message removal scheduler 120 of FIG. 1. The message removal scheduler 280 may analyze the message characteristics 225, the active messages 230, the removed messages 235, and/or the engagement log 240 to generate a message removal schedule 245 to remove messages from the active messages 230 to the removed messages 235. The current communication channel may include the messages in the active messages 230. The message manager 285 may follow the message removal schedule 245 and move messages from the active messages 230 to the removed messages 235.

The message removal scheduler 280 may analyze the message characteristics 225, the active messages 230, the removed messages 235, and/or the engagement log 240 using the message removal rules 255 and/or the message removal models 260. The message removal rules 255 may include various thresholds, ranges, and/or similar comparison tools. If part of the message characteristics 225, the active messages 230, the removed messages 235, and/or the engagement log 240 satisfies the threshold ranges, and/or other comparison tools, one of the message removal tools may specify a particular time period when a message should be moved from the active messages 230 to the removed messages 235.

The message removal models 260 may be configured to receive the message characteristics 225, the active messages 230, the removed messages 235, and/or the engagement log 240 along with data identifying the message for which to determine a removal schedule. The message removal models 260 may be configured to output data indicating a time period that the message should remain in the active message 230 before being moved to the removed messages 235

The one or more processors 210 may implement a model trainer 265 by executing software stored in the memory 215. The model trainer 265 may be configured to generate the message removal rules 255 by analyzing the historical data 250. The model trainer 265 may be configured to train the message removal models 260 using the historical data 250 and machine learning. Each rule of the message removal rules 255 may specify how to compare different portions of the message characteristics 225, the active messages 230, the removed messages 235, and/or the engagement log 240. Each model of the message removal models 260 may be configured to receive different portions of the message characteristics 225, the active messages 230, the removed messages 235, and/or the engagement log 240.

The historical data 250 may include data related to previous messages that were included in the communication channel and current messages in the communication channel. The historical data 250 may include messages included in other communications channels that may belong to different clubs or the same club as the communication channel. The historical data 250 may include data identifying a message, the timestamp when the server 200 received the message, a timestamp when the server 200 removed the message, the characteristics of the message, engagement of various users with the message, an importance score assigned to the message including an identity of a user or computing device who assigned or determined the score, whether any users requested the message after removal, an identity of users who have interacted with the message and what interactions each had, a club associated with the message, clubs that a user who interacted with the message belong to, interest groups that a user who interacted with the message are interested in, how a user who interacted with the message is affiliated with the club, and/or any other similar data.

In some implementations, the historical data 250 may include data related to manual curation that occurred on the communication channel. Manual curation may involve a user selecting a message for removal and that message being removed from the communication channel. In this instance, the historical data 250 may also include another data item that indicates whether the message was removed automatically by a computing device or in response to a manual request received from a user.

The model trainer 265 may group the historical data 250 into data samples. Each data sample may correspond to a message and may include the historical data related to that message. The model trainer 265 may assign a label to each data sample. The label may indicate the time period that the message remained an active message. After the time period, the message may have been moved to the removed messages. In some implementations, messages may have been reactivated in response to a user request. In this case, the time period in the data sample may be from the initial receipt of the message to the last removal of the message. In some cases with reactivated, the model trainer 265 may generate multiple data samples that each include the time period that the message was an active message. The message characteristics in the data sample may include a counter that indicates the number of times that the message was reactivated.

The model trainer 265 may train the message removal models 260 using machine learning and the labeled data samples that include the same type of data. Different labeled data samples may include different types of data depending on the data included in the historical data 250. For example, some labeled data samples may include engagement log data. Other labeled data samples may not include engagement log data. In this case and if the types of data are otherwise the same in the group of labeled data samples, the model trainer 265 may split the group of data samples into two groups. The first group may include labeled data samples that include engagement log data. The second group may include labeled data samples that do not include engagement log data. The model trainer 265 may train two models. The first model trained using the first group may be configured to receive data that includes engagement log data. The second model trained using the second group may be configured to receive the same type of data with the exception of engagement log data. Both the first and second models may be configured to output data indicating a time for a message to remain in the communication channel feed before being removed. The message removal scheduler 280 may be configured to select a model from the message removal models 260 based on the type of data received for the message in question.

The model trainer 265 may be configured to retrain the message removal models 260 using updated historical data and machine learning. As the message removal models 260 output data indicating a time period for removing a message and the message manager 285 removes messages, various users may request that a message may be reactivated and or made available for the user to view on a temporary basis. In this case, the model trainer 265 may update one or more labeled data samples for the requested message. The updated model trainer 265 may include an identity of the user who requested the removed message, a relationship that the user has to the club (full member, limited member (e.g., tennis member but not golf member), employee, etc.), the time period that the user has had that relationship with the club, the engagement that the user had with the message both before removal and after reactivation, a number of times that different users requested reactivation, and/or any other similar data. The model trainer 265 may retrain the message removal models 260 with the updated labeled data samples and machine learning. The message removal scheduler 280 may then use the updated message removal models 260.

The model trainer 265 may also be configured to analyze the historical data 265 to generate the message removal rules 255. The model trainer 265 may analyze the historical data 265 to identify patterns in historical data 265. Based on those patterns, the model trainer 265 may generate various thresholds, ranges, logical statements, and/or any other similar comparison techniques. For example, the model trainer 265 may determine that users do not look at menus after the meal has concluded. Based on this observation, the model trainer 265 may generate a message removal rule that specifies to remove a menu message twelve hours after the conclusion of the corresponding meal.

In some implementations, one or more of the rules in the message removal rules 255 may be specified by a user. These user-specified rules may specify message removal rules that may override the generated message removal rules. For example, a user-specified rule may specify to maintain, in perpetuity, messages that are related to ten, twenty, thirty, etc. club anniversary parties. Another user-specified rule may specify for messages related to sporting events to remain active until the next similar sporting event has occurred or is scheduled to occur. For example, a message related to a swim meet may remain active until the next scheduled swim meet. Another user-specified rule may specify for a message related to a sporting event remain active if a record was broken during the sporting event until that corresponding record is broken. For example, during a golf event, a player may shoot a course record for the club. In this case and based on this rule, the message removal scheduler 245 may maintain the message as active until the course record is broken in a subsequent golf event. Another user-specified rule may indicate for a message to be maintained as active for a period of time that is directly related to the importance score of the message. In other words, the higher the importance score, the longer the message is maintained. This relationship may or may not be proportional or linear. For example, a message with an importance score of 0.1 should be maintained for one day. A message with an importance score of 0.9 should be maintained for two years.

In some implementations, the message removal scheduler 245 may use both the message removal rules 255 and the message removal models 260 to analyze a message to determine an amount of time to maintain a message as active. There may be cases where the message removal rules 255 and the message removal models 260 provide conflicting instructions. For example, a message removal rule may specify to keep a message for a week and a message removal model may specify to keep a message for three days. In this case, the message removal scheduler 245 may average the two time period. Alternatively, the message removal scheduler 245 may select one week if the message removal rule that was used is a user-specified rule. Alternatively, the message removal scheduler 245 may select three days if the message removal model and the message removal rule were both generated by the model trainer 265.

Figure 3:
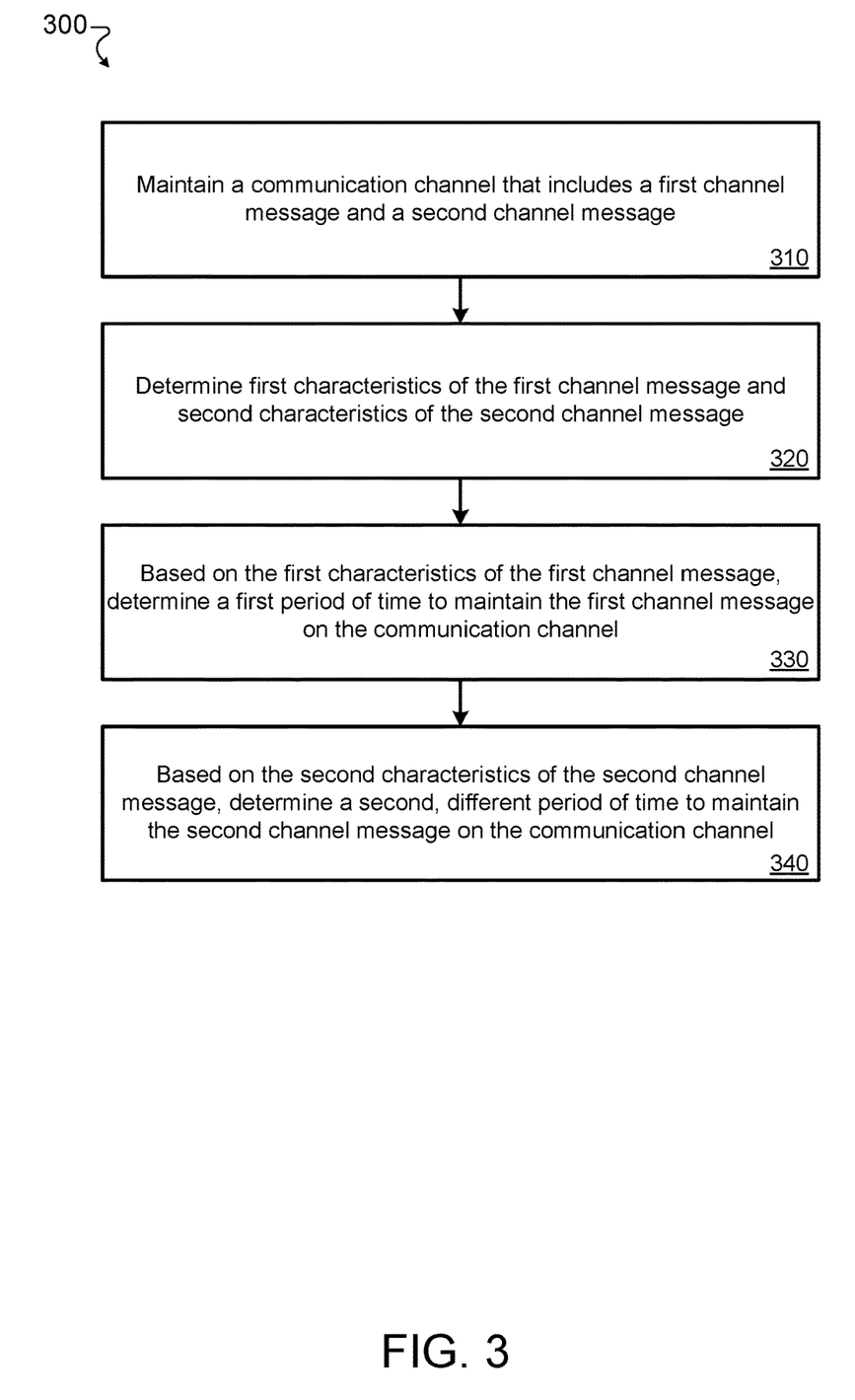
FIG. 3 is a flowchart of an example process for curating a communication channel in accordance with at least one embodiment.

FIG. 3 is a flowchart of an example process 300 for curating a communication channel. In general, the process 300 manages a communication channel that includes multiple messages. The process 300 determines characteristics of those messages. Based on those characteristics, the process 300 determines a time to remove some of the messages from the communication channel. The process 300 will be described as being performed by the server 108 of FIG. 1 and will include references to other components in FIG. 1. The process 300 may also be performed by the server 200 of FIG. 2. In some implementations, the process 300 may be performed by one or more computing devices, including virtual computing devices.

The server 108 maintains a communication channel that includes a first channel message and a second channel message (310). In some implementations, the first channel message and the second channel message may each include text, media content, user comments, data identifying an interest group associated with the message, data identifying a user who posted the message, a time and date that the server 108 received the message, and/or any other similar data.

The server 108 determines first characteristics of the first channel message and second characteristics of the second channel message (320). In some implementations, the first characteristics and the second characteristics may include the content of each message, the interest group associated with each message, user engagement for each message, a date of an event described in the message, and/or any other similar characteristics.

Based on the first characteristics of the first channel message, the server 108 determines a first period of time to maintain the first channel message on the communication channel (330). Based on the second characteristics of the second channel message, the server 108 determines a second, different period of time to maintain the second channel message on the communication channel (340). After either of the periods of time has elapsed, the server 108 may remove the corresponding message from the communication channel. In some implementations, the first period of time or the second, different period of time may be in perpetuity. In other words, the server 108 may keep a message that does not have a specified removal time period.

In some implementations, the server 108 may provide the first characteristics to a model. The model may be configured to receive characteristics of a channel message and output a time period for how long the server 108 should maintain the channel message on the communication channel. The model may receive the first characteristics and output the first time period. Similarly, the server 108 may provide the second characteristics to the model and receive, from the model, the second time period. In some implementations, the model may be configured to receive the corresponding message, another message, and/or characteristics of the other message as additional inputs.

In some implementations, the server 108 may determine the first or second time period based on any additional messages included in the communication channel. These additional messages may be active messages that are included in the communication channel or previously removed messages that were included in the communication channel but have since been removed. In this case, the model may be configured to receive these additional messages as another input.

In some implementations, the server 108 may determine an importance level of the first or second channel messages. The importance level may be value from zero to one where zero is an unimportant message and one is an important message. The server 108 may receive an importance level from a user who is providing the message. For example, a restaurant manager may provide a message that includes the menu for the day and assign an importance level of 0.1. As another example, a member manager may provide a message that introduces a new member and assign an importance level of 0.3. In some implementations, the server 108 may assign an importance level based on various factors such as the characteristics of the message, user engagement with previous messages, and/or any similar factors. The server 108 may use the importance level of a message to determine the time period to maintain the message. In some implementations, the model may be configured to receive the importance level as an input.

In some implementations, a user interacting with the communication channel may provide an input requesting a previous channel message. This may occur if a user viewed a message while the message was included in the communication channel, and the server 108 later removed the message. The user may view the communication channel and wonder why the message had been removed. The user may submit a request to reactivate the message, a question related to why the message was removed, and/or any other similar user submission. In some instances, the server 108 may provide an answer to the user, such as the importance of the message was low. The server 108 may also provide temporary access to the message.

In some implementations, the server 108 may use the user submission related to the removed message and characteristics of the removed message to determine the periods of time for the first and second messages. The model may be configured to receive the removed message and characteristics of the removed message as additional inputs. In some implementations, the characteristics of the removed message may include the date and time of adding the message to the communication channel and the date and time of removing the message from the communication channel.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   maintaining, by a computing device, a communication channel that includes a first channel message and a second channel message;

determining, by the computing device, first characteristics of the first channel message wherein the first characteristics include a first importance level that indicates a first likelihood that a first user will engage with the first channel message in the future;
determining, by the computing device, second characteristics of the second channel message, wherein the second characteristics include a second importance level that indicates a second likelihood that a second user will engage with the second channel message in the future;
based on the first characteristics that includes the first importance level that indicates the first likelihood that the first user will engage with the first channel message in the future, determining, by the computing device, a first period of time to maintain the first channel message on the communication channel;
based on the second characteristics of the second channel message that includes the second importance level that indicates the second likelihood that the second user will engage with the second channel message in the future, determining, by the computing device, a second, different period of time to maintain the second channel message on the communication channel;
scheduling, by the computing device, an automatic removal of the first channel message from the communication channel based on the first period of time; and
removing, by the computing device, the first channel message from the communication channel based on the scheduling the automatic removal of the first channel message from the communication channel.

2. The method of claim 1, wherein determining the second, different period of time to maintain the second channel message on the communication channel comprises determining to maintain the second channel message on the communication channel in perpetuity.

3. The method of claim 1, wherein determining the first period of time to maintain the first channel message on the communication channel comprises:
providing the first characteristics of the first channel message as an input to a model that is configured to receive given characteristics of a given channel message and output data indicating a given period of time to maintain the given channel message on the given communication channel; and
receiving, from the model, data indicating the first period of time to maintain the first channel message on the communication channel.

4. The method of claim 1, wherein the first characteristics of the first channel message comprise:
a content of the first channel message;
an interest group associated with the first channel message;
user engagement with the first channel message; and
a date of an event specified by the first channel message.

5. The method of claim 1, comprising:
determining, by the computing device, channel messages included in the communication channel,
wherein determining the first period of time to maintain the first channel message on the communication channel is based further on the channel messages included in the communication channel, and
wherein determining the second, different period of time to maintain the second channel message on the communication channel is based further on the channel messages included in the communication channel.

6. The method of claim 1, comprising:
receiving, by the computing device, a request for a third channel message that was previously removed from the communication channel; and
determining, by the computing device, third characteristics of the third channel message,
wherein determining the first period of time to maintain the first channel message on the communication channel is based further on the third characteristics of the third channel message and the request for the third channel message, and
wherein determining the second, different period of time to maintain the second channel message on the communication channel is based further on the third characteristics of the third channel message and the request for the third channel message.

7. A system, comprising:
one or more processors; and
memory including a plurality of computer-executable components that are executable by the one or more processors to perform a plurality of acts, the plurality of acts comprising:
maintaining a communication channel that includes a first channel message and a second channel message;
determining first characteristics of the first channel message and second characteristics of the second channel message;
determining additional channel messages included in the communication channel;
based on the first characteristics of the first channel message and based on the additional channel messages included in the communication channel, determining a first period of time to maintain the first channel message on the communication channel;
based on the second characteristics of the second channel message and based on the additional channel messages included in the communication channel, determining a second, different period of time to maintain the second channel message on the communication channel;
scheduling an automatic removal of the first channel message from the communication channel based on the first period of time; and
removing the first channel message from the communication channel based on the scheduling the automatic removal of the first channel message from the communication channel.

8. The system of claim 7, wherein determining the second, different period of time to maintain the second channel message on the communication channel comprises determining to maintain the second channel message on the communication channel in perpetuity.

9. The system of claim 7, wherein determining the first period of time to maintain the first channel message on the communication channel comprises:
providing the first characteristics of the first channel message as an input to a model that is configured to receive given characteristics of a given channel message and output data indicating a given period of time to maintain the given channel message on the given communication channel; and
receiving, from the model, data indicating the first period of time to maintain the first channel message on the communication channel.

10. The system of claim 7, wherein the first characteristics of the first channel message comprise:
- a content of the first channel message;
- an interest group associated with the first channel message;
- user engagement with the first channel message; and
- a date of an event specified by the first channel message.

11. The system of claim 7, wherein the plurality of acts comprise:
- determining a first importance level of the first channel message, wherein the first importance level indicates a first likelihood that a first user will engage with the first channel message at a first future time; and
- determining a second importance level of the second channel message, wherein the second importance level indicates a second likelihood that a second user will engage with the second channel message at a second future time,
- wherein determining the first period of time to maintain the first channel message on the communication channel is based further on the first importance level of the first channel message, and
- wherein determining the second, different period of time to maintain the second channel message on the communication channel is based further on the second importance level of the second channel message.

12. The system of claim 7, wherein the plurality of acts comprise:
- receiving a request for a third channel message that was previously removed from the communication channel; and
- determining third characteristics of the third channel message,
- wherein determining the first period of time to maintain the first channel message on the communication channel is based further on the third characteristics of the third channel message and the request for the third channel message, and
- wherein determining the second, different period of time to maintain the second channel message on the communication channel is based further on the third characteristics of the third channel message and the request for the third channel message.

13. One or more non-transitory computer-readable media storing computer-executable instructions that upon execution cause one or more computers to perform acts comprising:
- maintaining a communication channel that includes a first channel message and a second channel message;
- determining first characteristics of the first channel message and second characteristics of the second channel message;
- receiving a request for a third channel message that was previously removed from the communication channel;
- determining third characteristics of the third channel message;
- based on the first characteristics of the first channel message and based on the third characteristics of the third channel message and the request for the third channel message, determining a first period of time to maintain the first channel message on the communication channel;
- based on the second characteristics of the second channel message and based on the third characteristics of the third channel message and the request for the third channel message, determining a second, different period of time to maintain the second channel message on the communication channel;
- scheduling an automatic removal of the first channel message from the communication channel based on the first period of time; and
- removing the first channel message from the communication channel based on the scheduling the automatic removal of the first channel message from the communication channel.

14. The media of claim 13, wherein determining the second, different period of time to maintain the second channel message on the communication channel comprises determining to maintain the second channel message on the communication channel in perpetuity.

15. The media of claim 13, wherein determining the first period of time to maintain the first channel message on the communication channel comprises:
- providing the first characteristics of the first channel message as an input to a model that is configured to receive given characteristics of a given channel message and output data indicating a given period of time to maintain the given channel message on the given communication channel; and
- receiving, from the model, data indicating the first period of time to maintain the first channel message on the communication channel.

16. The media of claim 13, wherein the acts comprise:
- determining additional channel messages included in the communication channel,
- wherein determining the first period of time to maintain the first channel message on the communication channel is based further on the additional channel messages included in the communication channel, and
- wherein determining the second, different period of time to maintain the second channel message on the communication channel is based further on the additional channel messages included in the communication channel.

17. A computer-implemented method, comprising:
- maintaining, by a computing device, a communication channel that includes a first channel message and a second channel message;
- determining, by the computing device, first characteristics of the first channel message and second characteristics of the second channel message, wherein the first characteristics of the first channel message comprise a content of the first channel message, an interest group associated with the first channel message, user engagement with the first channel message, and a date of an event specified by the first channel message;
- based on the first characteristics of the first channel message, determining, by the computing device, a first period of time to maintain the first channel message on the communication channel;
- based on the second characteristics of the second channel message, determining, by the computing device, a second, different period of time to maintain the second channel message on the communication channel;
- scheduling an automatic removal of the first channel message from the communication channel based on the first period of time; and
- removing the first channel message from the communication channel based on the scheduling the automatic removal of the first channel message from the communication channel.

18. The method of claim 16, wherein determining, by the computing device, the second, different period of time to maintain the second channel message on the communication channel comprises determining to maintain the second channel message on the communication channel in perpetuity.

19. The method of claim 16, wherein determining, by the computing device, the first period of time to maintain the first channel message on the communication channel comprises:
- providing, by the computing device, the first characteristics of the first channel message as an input to a model that is configured to receive given characteristics of a given channel message and output data indicating a given period of time to maintain the given channel message on the given communication channel; and
- receiving, from the model, data indicating the first period of time to maintain the first channel message on the communication channel.

20. The method of claim 16, comprising:
- receiving, by the computing device, a request for a third channel message that was previously removed from the communication channel; and
- determining, by the computing device, third characteristics of the third channel message,
- wherein determining the first period of time to maintain the first channel message on the communication channel is based further on the third characteristics of the third channel message and the request for the third channel message, and
- wherein determining the second, different period of time to maintain the second channel message on the communication channel is based further on the third characteristics of the third channel message and the request for the third channel message.

\* \* \* \* \*